(12) United States Patent
Rogson (10) Patent No.: US 8,347,387 B1
(45) Date of Patent: *Jan. 1, 2013

(54) ADDRESSING SECURITY IN WRITES TO MEMORY

(76) Inventor: Ariel S. Rogson, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/185,307

(22) Filed: Jul. 18, 2011

Related U.S. Application Data (63) Continuation of application No. 12/049,916, filed on Mar. 17, 2008, now Pat. No. 8,015,612.

(60) Provisional application No. 60/914,550, filed on Apr. 27, 2007.

(51) Int. Cl.
*G06F 12/14* (2006.01)

(52) U.S. Cl. ............................................. 726/23; 726/22

(58) Field of Classification Search .................. None
See application file for complete search history.

(56) References Cited

U.S. PATENT DOCUMENTS

| | | | |
|---|---|---|---|
| 5,949,973 A | 9/1999 | Yarom | |
| 7,581,089 B1 | 8/2009 | White | |
| 7,603,704 B2 | 10/2009 | Bruening et al. | |
| 7,945,953 B1 | 5/2011 | Salinas et al. | |
| 8,015,612 B2 * | 9/2011 | Rogson | 726/23 |
| 2001/0021226 A1 | 9/2001 | Hatano et al. | |
| 2003/0177328 A1 | 9/2003 | Naganuma et al. | |
| 2008/0163359 A1 | 7/2008 | Conti | |

* cited by examiner

*Primary Examiner* — David Pearson
(74) *Attorney, Agent, or Firm* — Marger Johnson & McCollom PC

(57) ABSTRACT

A computer includes a processor. When an instruction to be executed by the processor involves writing to memory, the write can be redirected to a temporary area of memory. The correct amount of data can then be copied from the temporary area to the original target memory address. The advantages of the invention can be achieved, among other possibilities, via re-compiling the program or modifying instructions before execution.

24 Claims, 10 Drawing Sheets

ADDRESSING SECURITY IN WRITES TO MEMORY

RELATED APPLICATION DATA

This application is a continuation of U.S. patent application Ser. No. 12/049,916, filed Mar. 17, 2008, now U.S. Pat. No. 8,015,612, issued Sep. 6, 2011, which claims the benefit of U.S. Provisional Patent Application Ser. No. 60/914,550 filed Apr. 27, 2007, which is herein incorporated by reference for all purposes.

FIELD OF THE INVENTION

This invention pertains to memory management in computer system, and more particularly to addressing memory management to avoid buffer overflows.

BACKGROUND OF THE INVENTION

Originally, computers were programmed in binary code. The programmer had to program the bits (1s and 0s) individually. This was not a very efficient system, and soon led to the development of assembly language. Assembly language allowed programmers to use instructions that represented specific sequences of bits; when executed in sequence, the assembly language instructions constituted a program.

One feature of assembly language programming is the ability to jump from one location in the program to another. This functionality allows for the implementation of branching code, such as the "if-then" and "if-then-else" statements of higher level programming languages, where code was executed only if certain conditions were met. This functionality also enables the execution of subroutines—portions of code that can be invoked repeatedly, and from different places within the program.

Most computers implement the call of a subroutine using a concept call a stack. A stack is a portion of memory which is accessed on a "last in, first out" basis. When a transfer of processing to a subroutine is to be performed, the computer "pushes", or places, certain information on the stack. This information includes, among other data, some memory needed for variables used in the subroutine and the address to which control is to be returned when the subroutine is finished.

As a design for managing memory used in program execution in the computer, this model works quite well. But many modern operating systems are programmed in a particular higher level programming language: C. One of the features of C is that C does not check whether writes to memory are compliant with how the memory is allocated. For example, C does not verify whether the data being written to memory is of the type for which the memory space was allocated, or that the data being written will fit into the allocated memory space. Some programmers consider this a strength of the language, in that the program does not spend time enforcing such conditions. If the programmer considers type-checking or buffer overflow to be important, the programmer can test for such conditions in the program; otherwise, the programmer can trust that the program will not be misused.

But this strength is also a potential weakness. For example, Microsoft® releases many patches to its Windows® family of operating systems specifically to patch security flaws relating to buffer overflow issues. (Microsoft and Windows are registered trademarks of Microsoft Corporation in the United States and other countries.) The problem is that if more data is written than the target memory address can hold, the excess ends up overwriting other values in memory allocated for other purposes.

Hackers often use buffer overflow vulnerabilities to try and take control of user's computers. Specifically, the hackers attempt to overflow a buffer by writing a particular piece of data into the buffer. The hackers design the data so that it includes the code they use to take over the computer, along with an address where their code will be located in memory. If the hackers can overflow the buffer so that the address where their code is located overwrites the return address on the stack, then the hacker's code will be executed when the subroutine completes. The hacker can then gain control of the computer.

A need remains for a way to addresses these and other problems associated with the prior art.

SUMMARY OF THE INVENTION

In an embodiment of the invention, a write to an address in memory is redirected to a temporary location in memory. After the write to the temporary location is complete, a portion of the written data (potentially including the entirety of the written data) can be copied from the temporary location to the original destination of the write.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
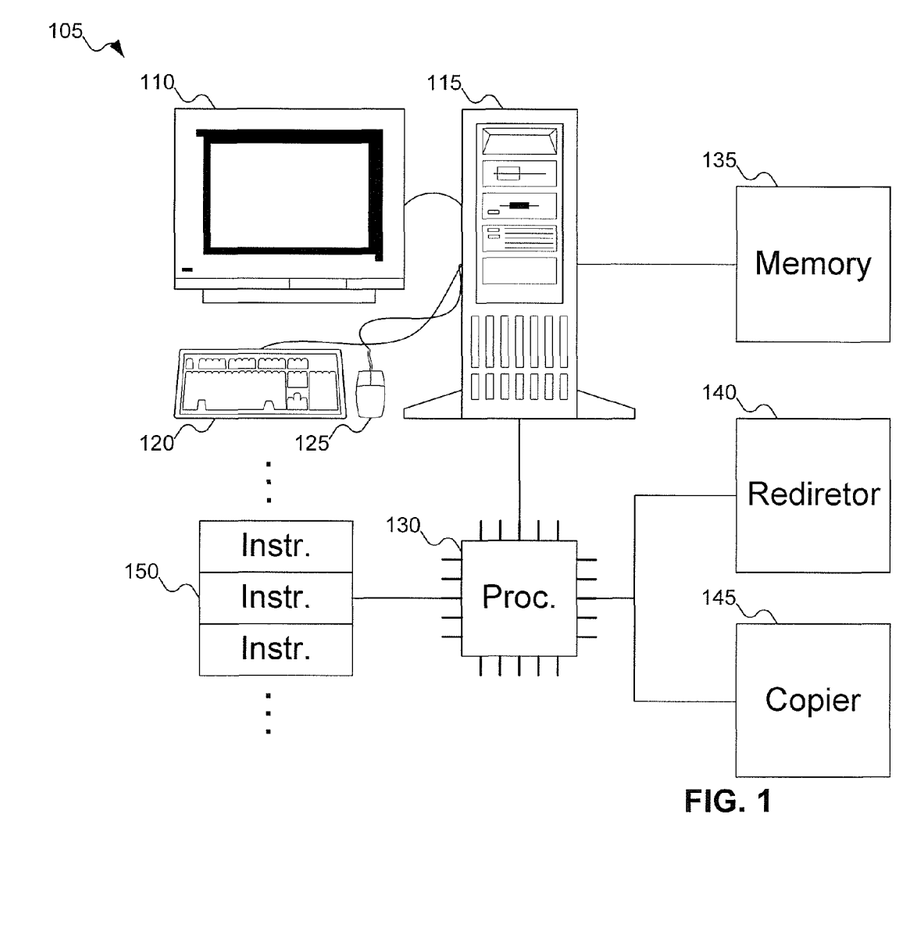
FIG. 1 shows a computer with a processor executing a sequence of instructions and memory, according to an embodiment of the invention.

FIG. 1 shows a computer with a processor executing a sequence of instructions and memory, according to an embodiment of the invention. In FIG. 1, computer system 105 is shown as including computer 110, monitor 115, keyboard 120, and mouse 125. A person skilled in the art will recognize that other components can be included with computer system 105: for example, other input/output devices, such as a printer. In addition, FIG. 1 computer system 105 can include conventional internal components: for example, central processing unit 130, memory 135, storage (not shown), etc. Although not shown in FIG. 1, a person skilled in the art will recognize that computer system 105 can interact with other computer systems, either directly or over a network (not shown) of any type. Finally, although FIG. 1 shows computer system 105 as a conventional desktop computer, a person skilled in the art will recognize that computer system 105 can be any type of machine or computing device capable of providing the services attributed herein to computer system 105, including, for example, a laptop computer, a personal digital assistant (PDA), or a cellular telephone.

Central processing unit 130, which can be any form of processor, including a multi-core processor, executes instructions. Memory 135 can store the instructions executed by central processing unit 130, along with other data used by the program (such as variables of the program).

Figure 2:
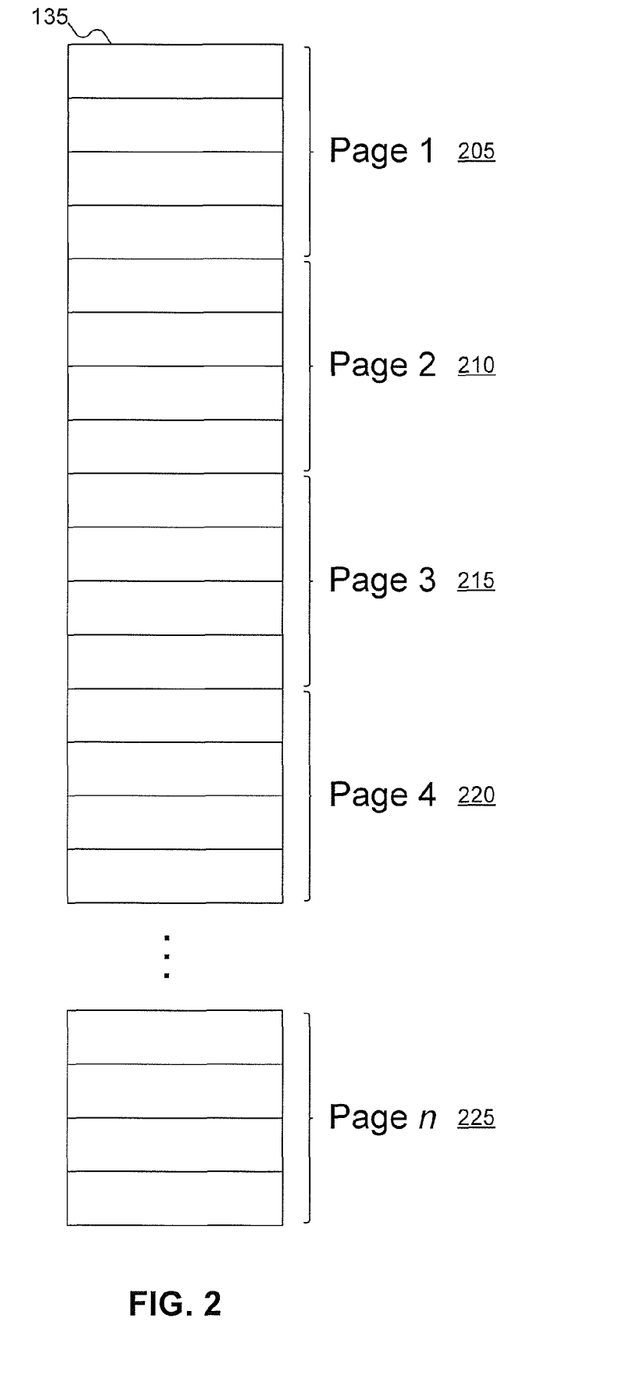
FIG. 2 shows the memory of FIG. 1 divided into pages.

Although memory can be directly addressed by a program, oftentimes the memory is organized into sections, called "pages". FIG. 2 shows the memory of FIG. 1 divided into pages. In FIG. 2, memory 135 is divided into n pages 205, 210, 215, 220, and 225. Each page of memory 135 includes a section of memory 135. Dividing memory 135 into pages also allows the computer system to pretend as though it has more memory than it actually has; the pages currently (or most recently) in use can be in the actual memory of the computer system, with the older pages stored in a secondary memory (for example, on a hard disk). Caching algorithms, such as Least Recently Used, Least Frequently Used, and others known in the art, can be used to control which pages of memory are active at any particular time.

Figure 3:
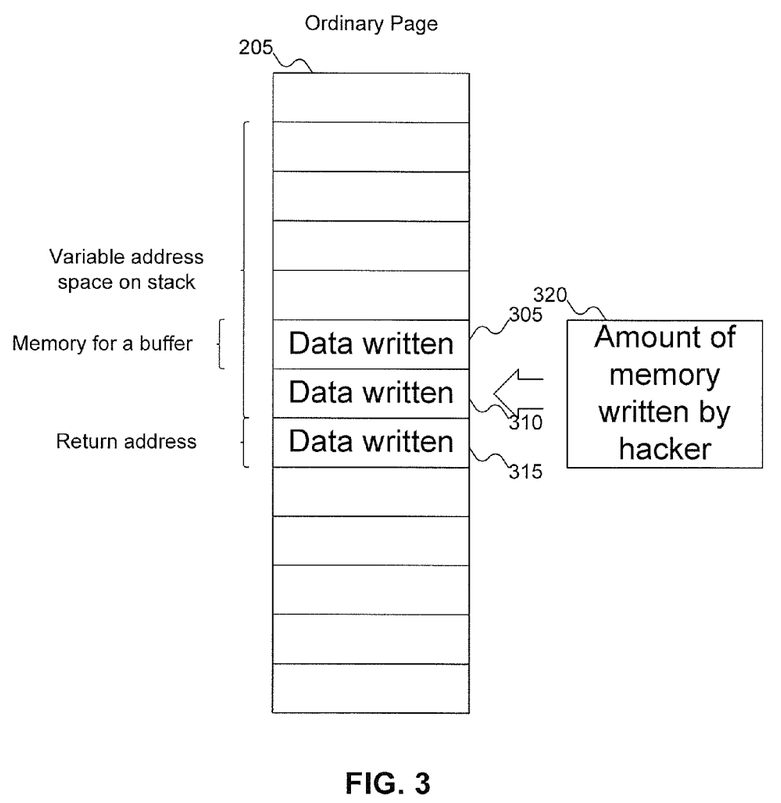
FIG. 3 shows a portion of memory in the computer of FIG. 1 into which a hacker is attempting a buffer overflow attack.

FIG. 3 shows a portion of memory in the computer of FIG. 1 into which a hacker is attempting a buffer overflow attack. In FIG. 3, page 205 of memory 135 is shown. Page 205 includes space for variables of a subroutine, as stored on the stack. One such variable is shown as address 305; adjacent (on one side) to address 305 is address 310, and next to that is address 315, which stores the return address to be used when the subroutine finishes execution.

A hacker, in an attempt to gain control over the computer, provides data 320, which is to be written into address 305. Note that data 320 is larger than address 305 can store; data 320 will overflow address 305, and overwrite the values in addresses 310 and 315. Such buffer overflows are possible because some higher level programming languages (such as C) do not check that the data being written will fit into the space allocated for the data. For example, in the C programming language, the "scanf" function can be used for input from the user. In its simplest form, this function takes a data type and an address in memory (which has the specified data type); the data that is input to the program is then formatted as that data type and written to that address in memory. But if the address in memory is for a two-byte integer and the input data is, for example, eight bytes long, then six additional bytes of data will be written to memory, and will overwrite data in adjacent memory addresses. As discussed above, the C programming language does not check to ensure that the amount of data received will fit into the available memory, thus making a buffer overflow possible. So, assuming that the hacker correctly structures data 320, the hacker can succeed in putting a different value into address 315, so that control will return to a piece of code written by the hacker, rather than the original point of return from the subroutine.

Figure 4:
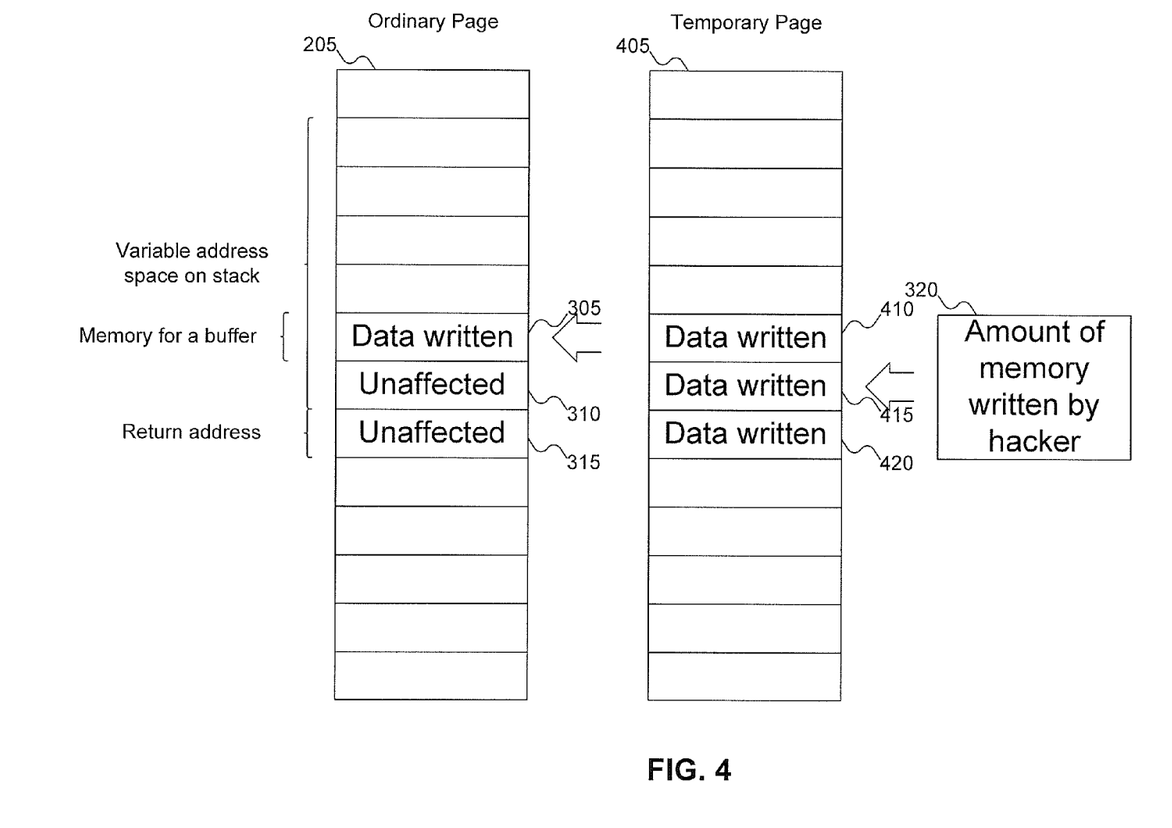
FIG. 4 shows the portion of memory of FIG. 3 with the data written to a temporary page of memory.

To prevent a buffer overflow attack like this, data to be written to memory is not written directly to the desired address. Instead, as shown in FIG. 4, data 320 is written to temporary page 405. Temporary page 405 is a page of memory used as a staging area for data being written to memory. Temporary page 405 can be created specifically for the purpose of writing data 320 to memory; or it can be reused for later writes to memory. Because temporary page 405 is used for writes to memory that might involve buffer overflows, it is preferred that temporary page 405 not be used for any other purposes as well (at least, until temporary page 405 is no longer used for data writes and preferably is "cleaned"—that is, erased).

Data 320 is written to temporary page 405 without any modification: exactly as if temporary page 405 were page 205. But after data 320 is written to temporary page 405 (in addresses 410, 415, and 420), the computer system identifies the size of the original target of the memory write, and then copies only the amount of data that correctly fills that address space. For example, since the original target of the write was only address 305, only address 410 is copied into address 305; addresses 415 and 420 are ignored, meaning that addresses 310 and 315 are unaffected by the hacker's attempt to overflow the buffer of address 305.

In FIG. 4, the amount of data represented by addresses 305, 310, and 315 is dependent on circumstances. For example, address 315 might represent only 2 bytes of data, whereas address 305 might represent 8 bytes of data. A person skilled in the art will recognize that addresses 305, 310, and 315 form a contiguous block of memory but the size of this block can vary with the circumstances.

It is true that the hacker's attempt to overflow the buffer of address 305 will mean that the data written into address 305 is not proper data, and might cause the program to behave incorrectly (even crash). But it is better for a program to crash than for the computer to be put under the control of a hacker. And if the hacker has put "random" data into the target of the write instruction, the expected behavior of the program likely cannot be predicted anyway.

Returning to FIG. 1, the components that implement the invention are shown. In FIG. 1, central processing unit 130 includes redirector 140 to redirect write instructions to a temporary page of memory, and copier 145 to copy data from the temporary page of memory to the original destination of the write instruction. A person skilled in the art will recognize that redirector 140 and copier 145 might not be physically separate from central processing unit 130, and might be implemented as firmware within central processing unit 130, among other possibilities.

Figure 5:
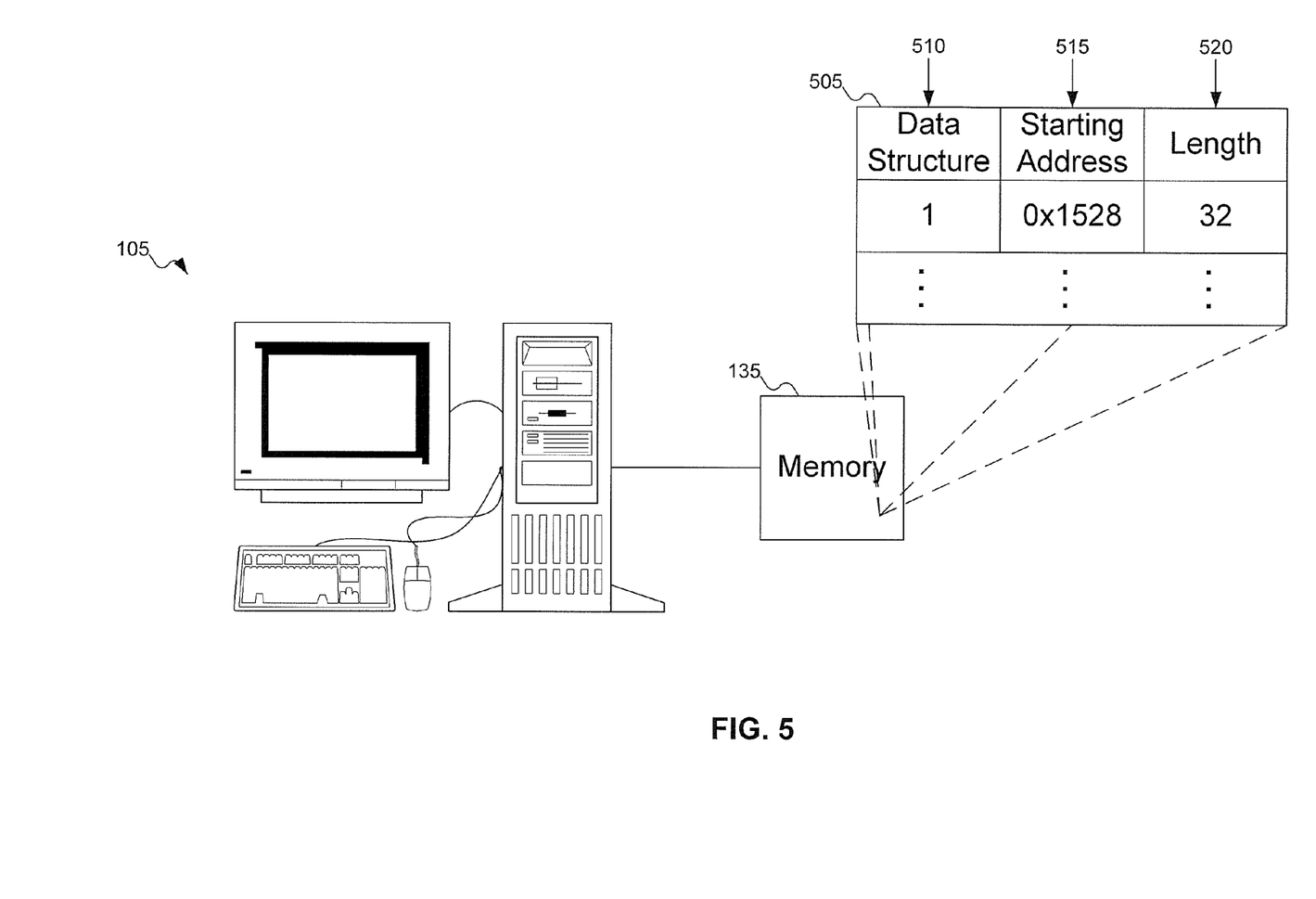
FIG. 5 shows the computer of FIG. 1, with a data structure identifying the starting address and length of a variable in memory.

Left unanswered by FIG. 4 is how the computer knows how much data to copy (that is, that the data includes only address 305 and not, say, address 310). FIG. 5 answers this question. FIG. 5 shows the computer of FIG. 1, with a data structure identifying the starting address and length of a variable in memory. In FIG. 5, memory 135 includes information 505, which stores information about data structures in memory 135. Information 505 identifies a data structure (510), a starting address (515) for the data structure, and a length (520) for the data structure. (While this description and FIG. 5 describes information 505 as storing address and length for "data structures", a person skilled in the art will recognize that information 505 can also store information about "basic data types", such as "character", "string", "integer", "float", "single", "double", etc.) Computer 105 normally stores this information 505 anyway, so that it can properly allocate memory for variables in a program (although perhaps in some other form than that shown in FIG. 5). For example, computer 105 "knows" that the data structure beginning at memory address 0x1528 is 32 bytes long. This enables computer 105 to be able to determine how much data to copy from temporary page 405 to memory page 205 in FIG. 4: computer 105 identifies the length of the data structure at that memory address from information 505.

Figure 6:
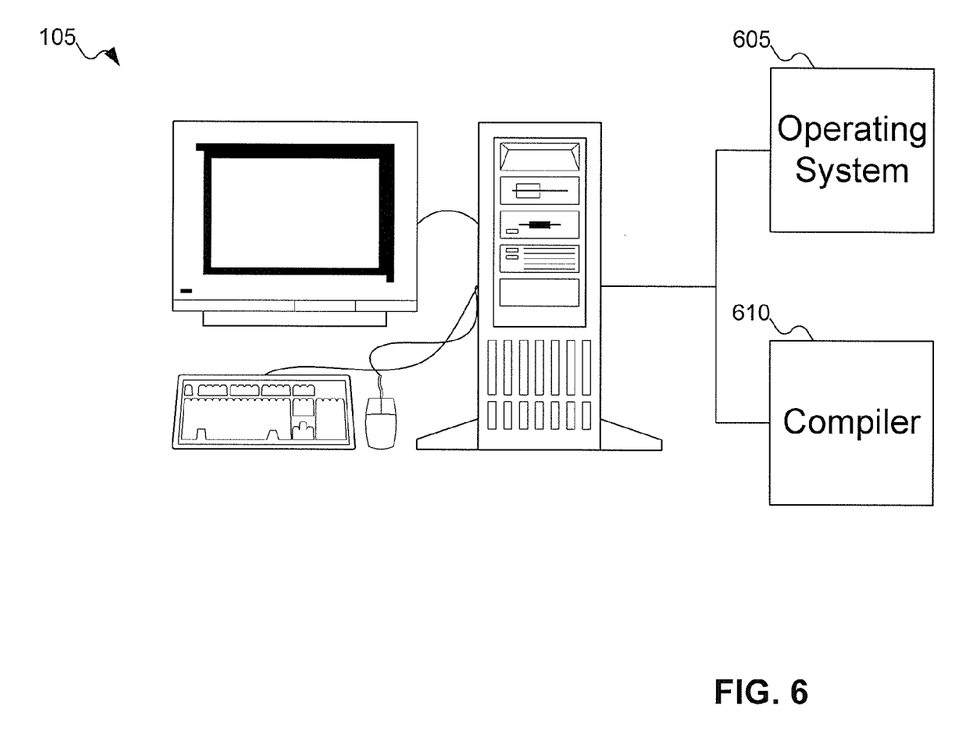
FIG. 6 shows the computer of FIG. 3 with an operating system and a compiler.

FIG. 6 shows the computer of FIG. 3 with an operating system and a compiler. FIG. 6 shows two different ways in which computer 105 can achieve the results described above. One way is for operating system 605 to modify writes to memory to take advantage of temporary pages. Another is for compiler 610 to be used to re-compile the program, assuming that compiler 610 is designed to implement the use of temporary pages. There are advantages and disadvantages to both methods. Having operating system 605 modify write instructions on-the-fly provides the advantage of embodiments of the invention to legacy programs that are not (or cannot) be re-compiled using compiler 610. But because operating system 605 would analyze commands before the execute to determine if they are potentially subject to a buffer overflow attack, overall program execution would likely be slower. On the other hand, re-compiling a program using compiler 610 provides the advantages of embodiments of the inventions without the delay inherent in operating system 605 analyzing instructions individually. But then embodiments of the invention are only available to programs that have been re-compiled with compiler 610: legacy programs that have not (or cannot) be re-compiled would not gain the benefit of embodiments of the invention.

A person skilled in the art will recognize that the use of operating system 605 or compiler 610 are only two ways in which embodiments of the invention can be implemented. Where there are other ways to provide the advantages of features of embodiments of the invention, a person skilled in the art will recognize how this advantages can be achieved.

Figure 7:
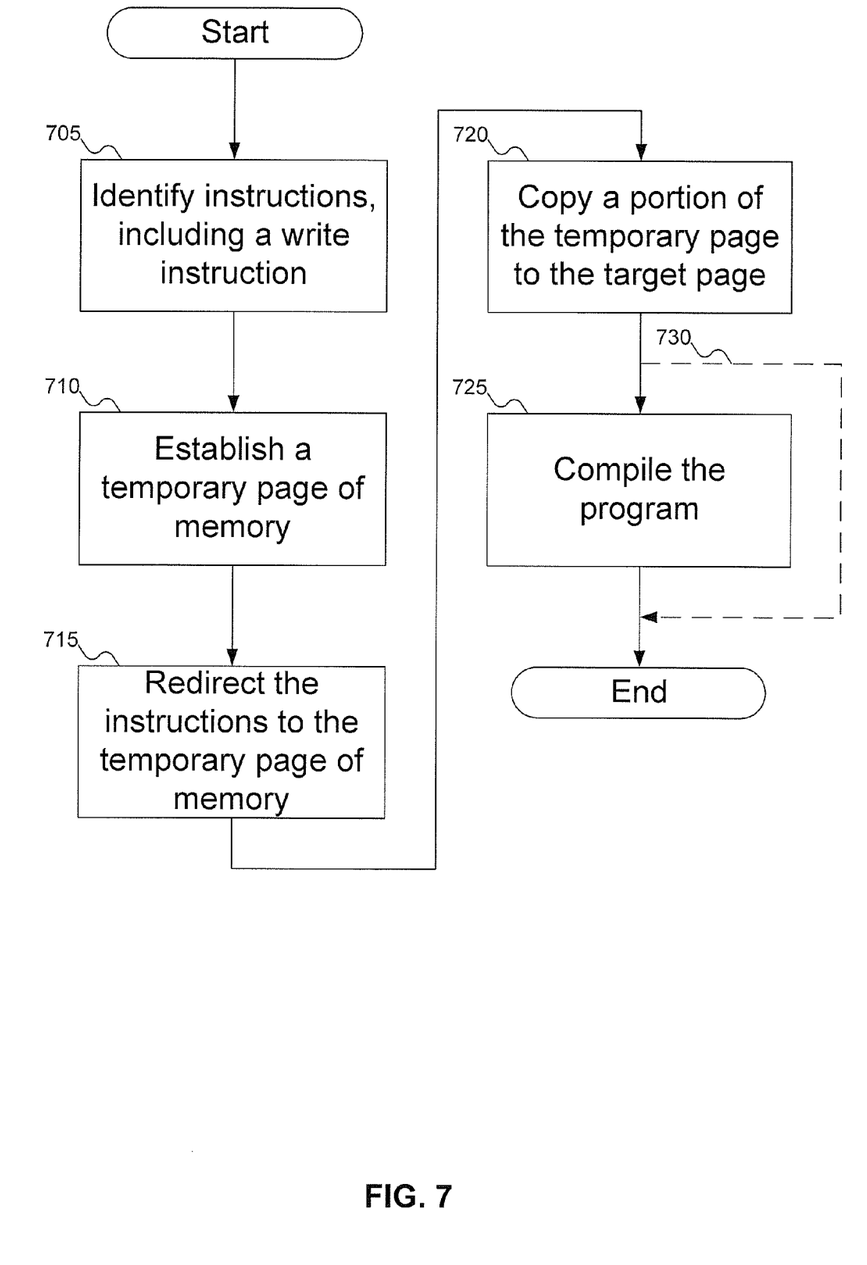
FIG. 7 shows a flowchart of a method to address security in writes to the memory of the computer of FIG. 1.

FIG. 7 shows a flowchart of a method to address security in writes to the memory of the computer of FIG. 1. In FIG. 7, at block 705, instructions, such as write instructions, that can benefit from embodiments of the invention are identified. At block 710, a temporary page of memory is established. At block 715, the identified instructions are redirected to use the temporary page of memory, rather than the original targets of the instructions. At block 720, a portion of the memory of the temporary page is copied to the original targets of the instructions. Finally, at block 725, the program can be re-compiled achieve the desired results. As shown by dashed line 730, block 725 is optional, and can be omitted: for example, if blocks 705-725 are carried out by the operating system.

Figure 8A:
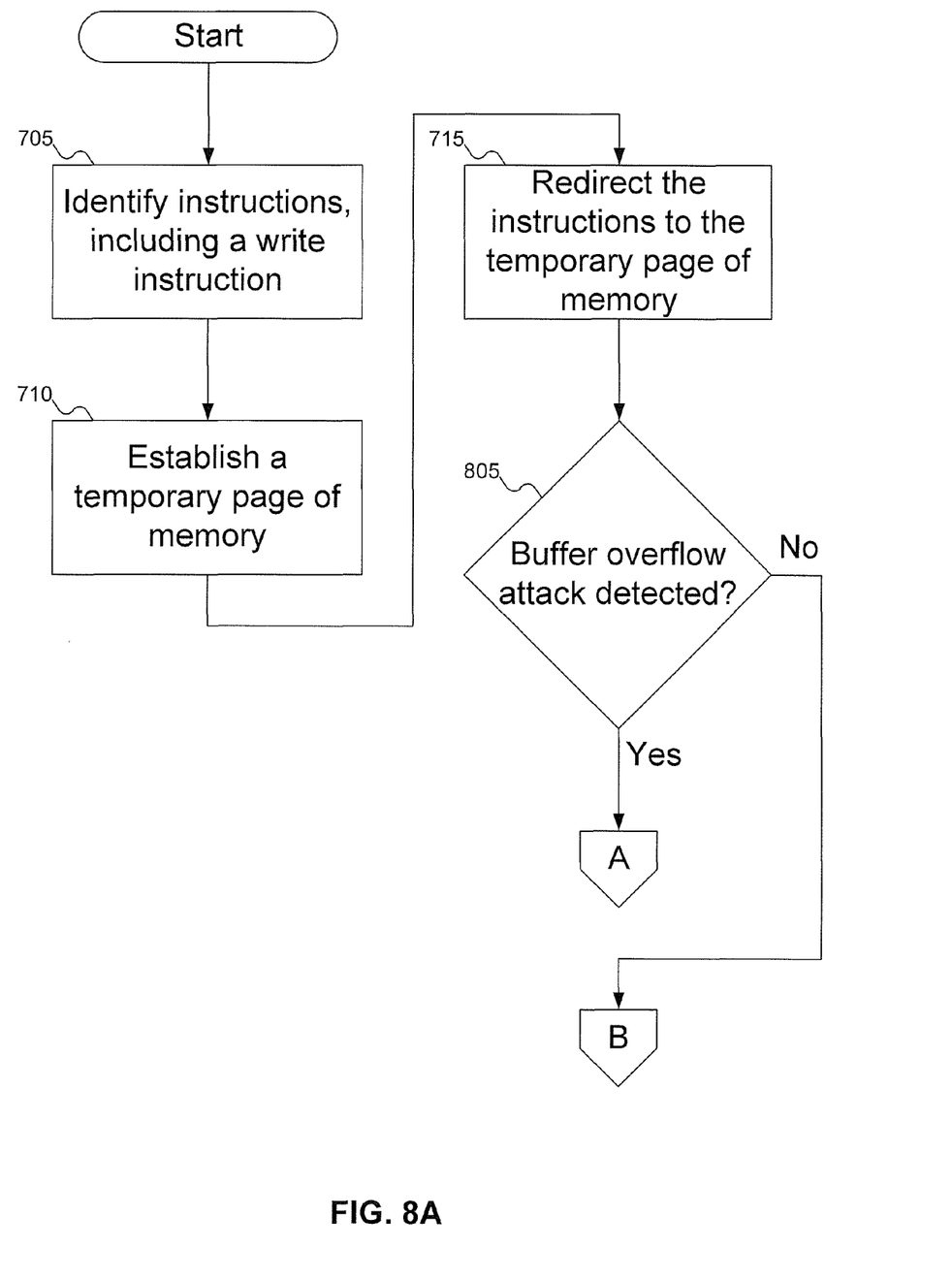
FIGS. 8A-8B show a flowchart of a second method to address security in writes to the memory of the computer of FIG. 1.
Figure 8B:
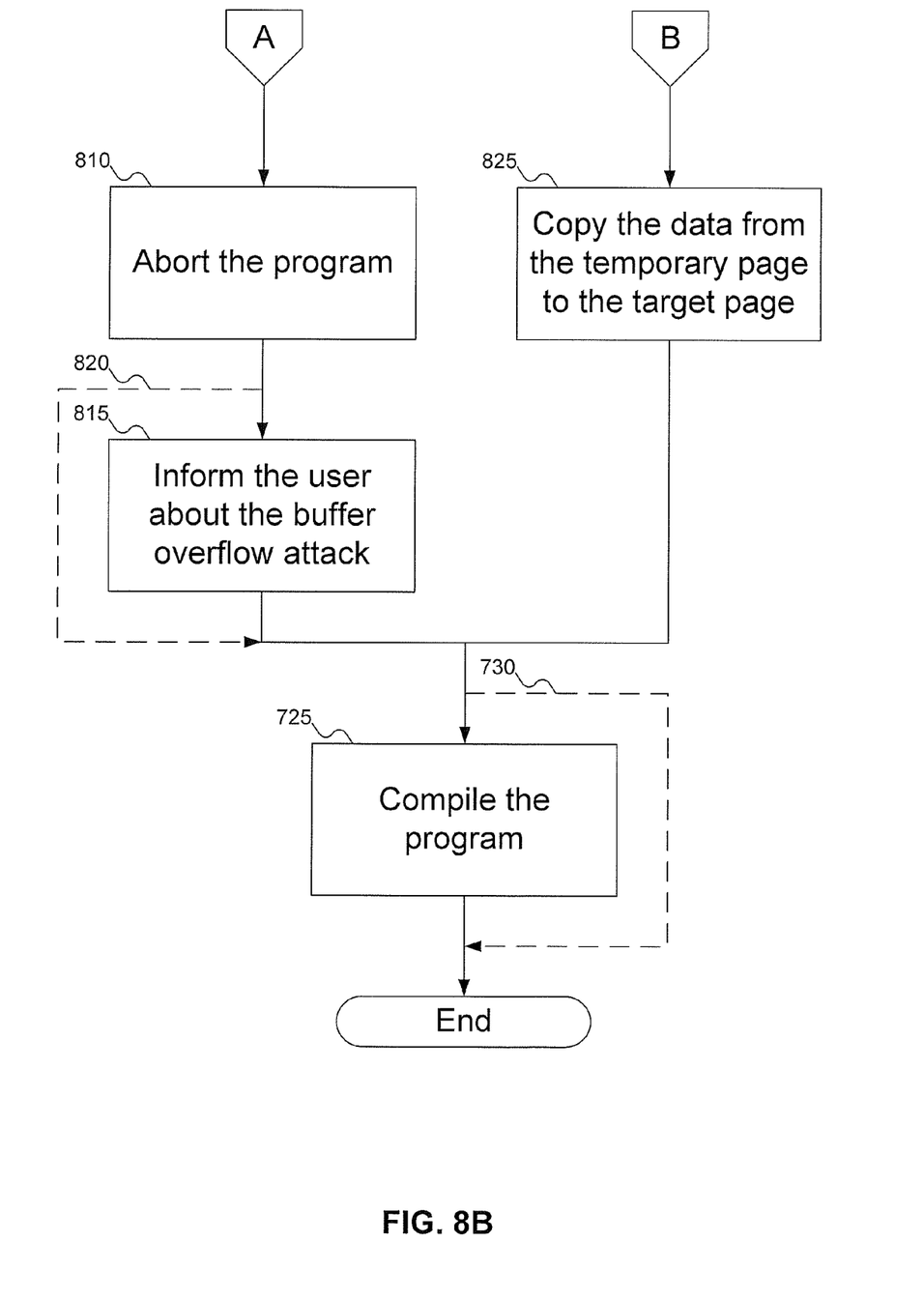

Another embodiment of the invention recognizes that if a hacker is attempting a buffer overflow attack, the data that could be copied into the original target memory address is likely to be meaningless to the program. Instead, the system can detect a buffer overflow attack has occurred and abort the program, informing the user of the attack. FIGS. 8A-8B reflects this variation. In FIG. 8A, blocks 705-715 are the same as blocks 705-715 of FIG. 7. At block 805, the system determines whether a buffer overflow attack has occurred. More specifically, the system determines if more data was written to the temporary page than would fit into the target memory address. This can be accomplished, for example, by setting the temporary page to store a known value (for example, all 0s); then, if more data is written than would fit into the original target memory address, the excess can be identified by a change from the known value outside the bounds of the data structure.

If the system detects a buffer overflow attack, then at block 810 (FIG. 8B) the system can abort the program. The system can also inform the user about the attempted buffer overflow attack, as shown in block 815; this block can be omitted, as shown by dashed line 820. On the other hand, if there is no buffer overflow attack, then at block 825 the data can be copied into the original target memory address. Block 825 is similar to block 720 of FIG. 7; but because there is no buffer overflow attack, the entirety of the written data can be copied, rather than just a portion. Finally, block 725 is the same as block 725 of FIG. 7, and can again be omitted as shown by dashed line 730 (for the same reasons).

Figure 9:
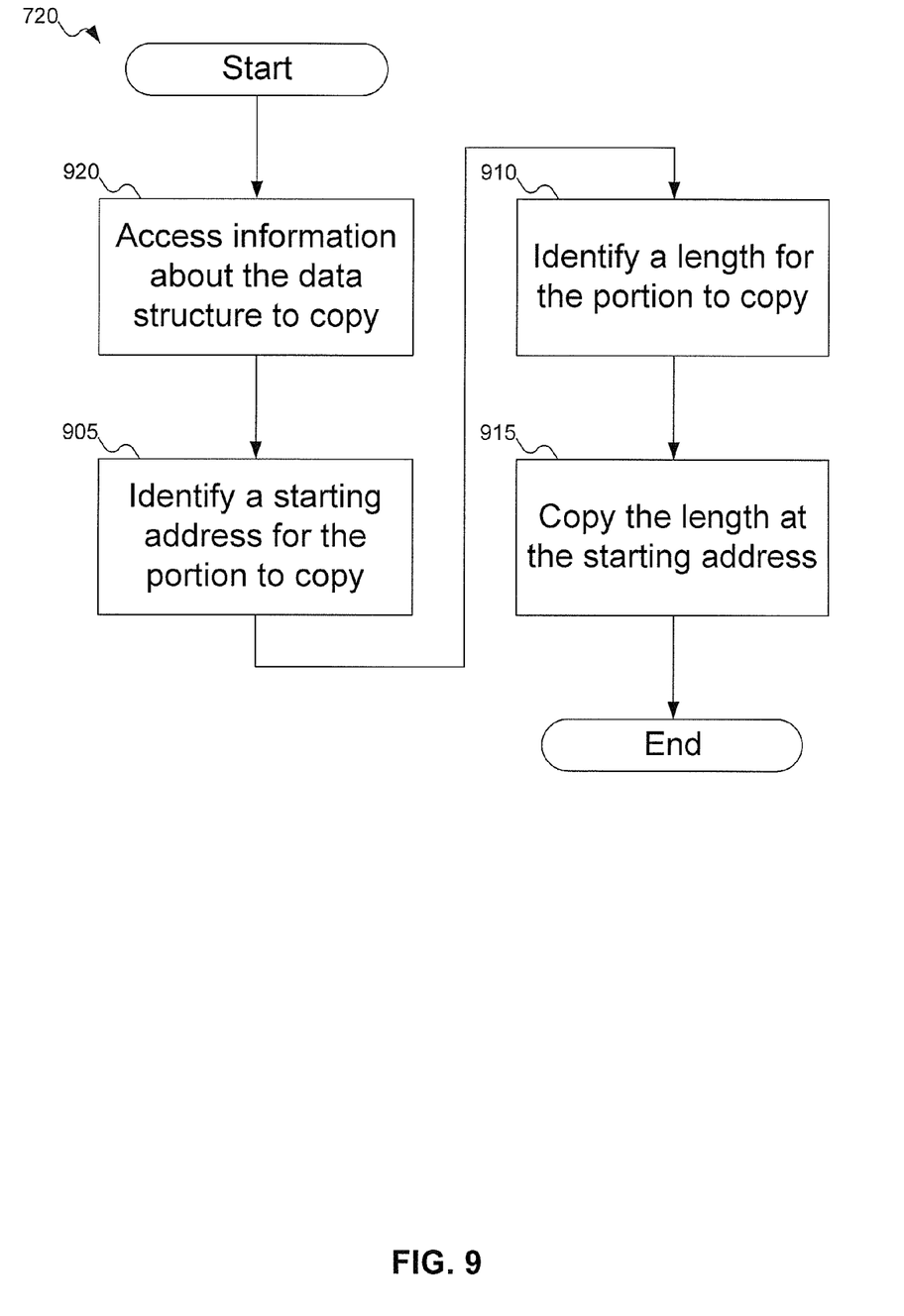
FIG. 9 shows a flowchart of a method to identify the portion of the memory to copy from the temporary page of FIG. 4.

FIG. 9 shows a flowchart of a method to identify the portion of the memory to copy from the temporary page of FIG. 4, showing more detail about block 720 of FIG. 7. In FIG. 9, at block 905, information is accessed about the data structure to copy. At block 910, a starting address for the data structure to copy is identified. At block 915, a length for the data structure to be copied is identified. Finally, at block 920, the data, beginning at the identified starting address and running for the identified length, is copied.

While the above description is focused on preventing buffer overflow attacks, a person skilled in the art will recognize that similar techniques can be used to address other types of attacks on a computer system. For example, type-checking can be enforced using embodiments of the invention. Once the data is written to the temporary page, before the data is copied to the original target address of the instruction, the data can be checked to ensure it is of the correct type; if not, the system can respond appropriately. Other embodiments of the invention can check for other possible abuses of the system, such as checking that array indices are within the bounds of the array.

The following discussion is intended to provide a brief, general description of a suitable machine in which certain aspects of the invention can be implemented. Typically, the machine includes a system bus to which is attached processors, memory, e.g., random access memory (RAM), read-only memory (ROM), or other state preserving medium, storage devices, a video interface, and input/output interface ports. The machine can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine can include embedded controllers, such as programmable or non-programmable logic devices or arrays, Application Specific Integrated Circuits, embedded computers, smart cards, and the like. The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE)545.11, Bluetooth, optical, infrared, cable, laser, etc.

The invention can be described by reference to or in conjunction with associated data including functions, procedures, data structures, application programs, instructions, etc. which, when accessed by a machine, result in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, and other tangible, physical storage media. Associated data can also be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as can come within the scope and spirit of the following claims and equivalents thereto.

The invention claimed is:

1. A computer, comprising:
   a memory including at least one page of memory; and
   a processor, including:
      a redirector to redirect a write instruction from a first address on said one page of memory to a second address of memory; and
      a copier to copy a portion of memory starting at said second address of memory to said first address on said one page of memory after the write to said second address is complete.

2. A computer according to claim 1, wherein the computer is designed to prevent a buffer overflow attack.

3. A computer according to claim 1, wherein the processor is operative to identify a starting address and a length for said portion of memory starting at said second address of memory.

4. A computer according to claim 3, wherein the processor is operative to identify said starting address and said length for said portion of said temporary page of memory based on information about a data structure starting at said first address on said one page of memory.

5. A computer according to claim 1, further comprising a compiler to compile a program including said write instruction, thereby including instructions for the processor to redirect said write instruction and to copy said portion of memory from said second address of memory to said first address on said one page of memory.

6. A computer according to claim 1, further comprising an operating system to identify said write instruction and instruct the processor to redirect said write instruction and to copy said portion of memory from said second address of memory to said first address on said one page of memory.

7. A computer according to claim 1, wherein the processor further includes an attack detector that is operative to notify a user about an attack.

8. A computer according to claim 1, wherein the processor is operative to identify a length for said portion of memory starting at said second address of memory as a distance between said first address in memory on said one page of memory and an end to memory allocated for variables in a subroutine.

9. A method, comprising:
   identifying an instruction to write to an address in a page of memory of a computer;
   establishing a temporary area in the memory of the computer;
   redirecting the instruction to write to the address to the temporary area of memory; and
   copying at least a portion of the temporary area of memory to a corresponding portion of the page of memory.

10. A method according to claim 9, wherein the method is operative to prevent a buffer overflow attack on the computer.

11. A method according to claim 9, wherein copying at least a portion of the temporary area of memory to a corresponding portion of the page of memory includes:
   identifying a starting address for the portion of the temporary area of memory;
   identifying a length for the portion of the temporary area of memory; and
   copying the length of memory beginning at the starting address for the portion of the temporary area of memory to a corresponding address in the page of memory.

12. A method according to claim 11, wherein identifying a length for the portion of the temporary page of memory includes:
   accessing information in the memory that identifies a length for a data structure beginning at the address in the page of memory; and
   using the length for the data structure stored at the address in the page of memory as the length for the portion of the temporary area of memory.

13. A method according to claim 11, wherein identifying a length for the portion of the temporary page of memory includes:
   identifying an end to memory allocated for variables in a subroutine; and
   using a distance between the address in the page of memory and the end to memory allocated for the variables in the subroutine as the length for the portion of the temporary area of memory.

14. A method according to claim 9, further comprising compiling a program including the instruction to write to an address in a page of memory to perform the method of claim 9.

15. A method according to claim 9, wherein the steps of identifying the instruction, establishing the temporary area, redirecting the instruction, and copying the at least a portion of the temporary area of memory are performed by an operating system at a time when the instruction is executed by the computer.

16. A method according to claim 9, further comprising:
   detecting an attack on the computer; and
   notifying a user about the attack on the computer.

17. An article, comprising a non-transitory storage medium, said non-transitory storage medium having stored thereon instructions that, when executed by a machine, result in:
   identifying an instruction to write to an address in a page of memory of a computer;
   establishing a temporary area in the memory of the computer;

redirecting the instruction to write to the address to the temporary area of memory; and copying at least a portion of the temporary area of memory to a corresponding portion of the page of memory.

18. An article according to claim 17, wherein the article is operative to prevent a buffer overflow attack on the computer.

19. An article according to claim 17, wherein copying at least a portion of the temporary area of memory to a corresponding portion of the page of memory includes:
   identifying a starting address for the portion of the temporary area of memory;
   identifying a length for the portion of the temporary area of memory; and
   copying the length of memory beginning at the starting address for the portion of the temporary area of memory to a corresponding address in the page of memory.

20. An article according to claim 19, wherein identifying a length for the portion of the temporary area of memory includes:
   accessing information in the memory that identifies a length for a data structure beginning at the address in the page of memory; and
   using the length for the data structure stored at the address in the page of memory as the length for the portion of the temporary area of memory.

21. An article according to claim 19, wherein identifying a length for the portion of the temporary page of memory includes:
   identifying an end to memory allocated for variables in a subroutine; and
   using a distance between the address in the page of memory and the end to memory allocated for the variables in the subroutine as the length for the portion of the temporary area of memory.

22. An article according to claim 17, said non-transitory storage medium has stored thereon further instructions that, when executed by the machine, result in compiling a program including the instruction to write to an address in a page of memory to establish the instructions of claim 15.

23. An article according to claim 17, wherein the steps of identifying the instruction, establishing the temporary area, redirecting the instruction, and copying the at least a portion of the temporary area of memory are performed by an operating system at a time when the instruction is executed by the computer.

24. An article according to claim 17, said non-transitory storage medium has stored thereon further instructions that, when executed by the machine, result in:
   detecting an attack on the computer; and
   notifying a user about the attack on the computer.

* * * * *